United States Patent
Sato et al.

[11] Patent Number: 5,952,628
[45] Date of Patent: Sep. 14, 1999

[54] MULTIPLE-WAY ELECTRONIC COMPONENT WITH PUSH SWITCH

[75] Inventors: Jun Sato; Koji Ono, both of Tsuyama, Japan

[73] Assignee: Matsushita Electric Industrial Co., Ltd., Osaka, Japan

[21] Appl. No.: 09/025,866

[22] Filed: Feb. 19, 1998

[30] Foreign Application Priority Data

Feb. 25, 1997 [JP] Japan .................................. 9-040418

[51] Int. Cl.[6] .................................................. H01H 9/00
[52] U.S. Cl. ............................................. 200/4; 200/6 A
[58] Field of Search .................. 200/4, 18, 6 A

[56] References Cited

U.S. PATENT DOCUMENTS

| | | | |
|---|---|---|---|
| 3,784,746 | 1/1974 | Hess ........................................ | 200/4 X |
| 4,245,137 | 1/1981 | Hirai et al. .................................. | 200/4 |
| 5,180,050 | 1/1993 | Rada et al. .............................. | 200/4 X |
| 5,430,262 | 7/1995 | Matsui et al. . | |
| 5,510,810 | 4/1996 | Nishijima et al. . | |
| 5,621,196 | 4/1997 | Nishijima et al. ....................... | 200/6 A |
| 5,691,517 | 11/1997 | Yamamoto et al. .................... | 200/6 A |
| 5,847,335 | 12/1998 | Sugahara et al. .......................... | 200/4 |

Primary Examiner—Renee S. Luebke
Attorney, Agent, or Firm—Pollock, Vande Sande & Amernick

[57] ABSTRACT

A multiple-way electronic component includes a box-shaped casing having an upper wall, a lower wall, and an intermediate wall. The upper wall has a circular opening. A first push switch is located on a central area of the lower wall of the casing. Second, third, fourth, and fifth push switches are located on peripheral areas of the lower wall of the casing. A resilient contact arm is supported on the lower wall of the casing. A rotary member is rotatably supported by the intermediate wall of the casing. The rotary member has a polygonal hole. A movable contact retained by the rotary member moves into and out of contact with the resilient contact arm in accordance with rotation of the rotary member. An operation member has a lower end which fits in the polygonal hole in the rotary member. The lower end of the operation member engages the first push switch. The operation member has a cylindrical shaft extending upward from the lower end thereof. The cylindrical shaft extends to an exterior of the casing through the circular opening in the upper wall of the casing. The operation member and the rotary member are rotatable together. The operation member is movable upward and downward relative to the rotary member. A drive member connected to the cylindrical shaft has downward projections engaging the second, third, fourth, and fifth push switches respectively.

3 Claims, 6 Drawing Sheets

MULTIPLE-WAY ELECTRONIC COMPONENT WITH PUSH SWITCH

BACKGROUND OF THE INVENTION

1. Field of the Invention

This invention relates to a composite switch device or an electronic component with a push switch which can be operated in multiple ways.

2. Description of the Related Art

U.S. Pat. No. 5,180,050 discloses a pushbutton rotary switch in which a switch actuator mounted in a housing for axial and rotary movement operates a rotary switch on the actuator axis through an axial lost motion connection. A pushbutton switch offset from the axis is engaged by a semi-circular plate radially extending from the actuator and is actuated upon axial movement of the actuator for any rotary position of the actuator. Optionally, the plate has apertures which register with the pushbutton switch at selected actuator rotary positions to disable pushbutton operation at the selected positions. The actuator is made of light conducting transparent plastic to illuminate an indicator on the switch knob from a bulb within the housing. A flexible detent finger integrally moulded into the housing engages the plate during its axial movement to impart tactile feel.

In the pushbutton rotary switch of U.S. Pat. No. 5,180,050, a pushbutton switch portion and a rotary switch portion can be operated by a common knob. The knob is mounted on an end of a stem connected to both the control button of the pushbutton switch portion and the control shaft of the rotary switch portion. The stem has a step, and a larger-diameter portion and a smaller-diameter portion extending in opposite sides of the step respectively. The smaller-diameter portion of the stem extends into a housing through a hole in walls of the housing. The larger-diameter portion of the stem is located in the housing. The hole in the walls of the housing is smaller in cross-sectional area than the larger-diameter portion of the stem. When the stem assumes a normal position, the step of the stem abuts against the walls of the housing.

The pushbutton rotary switch of U.S. Pat. No. 5,180,050 can be operated in only two different ways corresponding to the pushbutton switch and the rotary switch respectively.

SUMMARY OF THE INVENTION

It is an object of this invention to provide an improved electronic component with a push switch which can be operated in multiple ways.

A first aspect of this invention provides a multiple-way electronic component comprising a box-shaped casing having an upper wall, a lower wall, and an intermediate wall, the upper wall having a circular opening at its central area, and the intermediate wall being located between the upper wall and the lower wall. The first aspect of the invention further comprises a first push switch disposed in the casing and located on a central area of the lower wall of the casing; and second, third, fourth, and fifth push switches disposed in the casing and located on peripheral areas of the lower wall of the casing. A resilient contact arm is disposed in the casing and supported on the lower wall of the casing. A rotary member is disposed in the casing and rotatably supported by the intermediate wall of the casing, the rotary member having a polygonal hole at its central area. A movable contact is retained by the rotary member, and is movable into and out of contact with the resilient contact arm in accordance with rotation of the rotary member. An operation member has a lower end which fits in the polygonal hole in the rotary member and which has a shape corresponding to a shape of the polygonal hole, the lower end engaging the first push switch. The operation member has a cylindrical shaft extending upward from the lower end thereof, the cylindrical shaft extending to an exterior of the casing through the circular opening in the upper wall of the casing. The operation member and the rotary member are rotatable together, the operation member being movable upward and downward relative to the rotary member, and the operation member being tiltable relative to the rotary member. The first aspect of the invention further comprises a drive member having an upward projection which rotatably and tiltably contacts a lower surface of the upper wall of the casing around its circular opening, the upward projection having a central hole through which the cylindrical shaft extends, and the cylindrical shaft being rotatable relative to the upward projection of the drive member. The cylindrical shaft as being movable upward and downward relative to the upward projection of the drive member, the drive member having downward projections engaging the second, third, fourth, and fifth push switches respectively.

A second aspect of this invention is based on the first aspect thereof, and provides a multiple-way electronic component wherein the resilient contact arm and the movable contact form a rotary encoder.

A third aspect of this invention is based on the first aspect thereof, and provides a multiple-way electronic component further comprising a click spring provided between the rotary member and the intermediate wall of the casing, the click spring having a downward projection engaging a rugged surface of the rotary member for providing a tactile feeling during rotation of the rotary member.

A fourth aspect of this invention provides a composite device comprising a rotary encoder; a push switch; a lever switch; and a common operation shaft connected to the rotary encoder, the push switch, and the lever switch for operating the rotary encoder, the push switch, and the lever switch.

A fifth aspect of this invention is based on the fourth aspect thereof, and provides a composite device further comprising a casing which accommodates the rotary encoder, the push switch, and the lever switch, and wherein the common operation shaft extends through a wall of the casing.

A sixth aspect of this invention is based on the fifth aspect thereof, and provides a composite device wherein the rotary encoder has a polygonal hole, and the common operation shaft has an end which has a shape corresponding to a shape of the polygonal hole and which fits in the polygonal hole.

A seventh aspect of this invention is based on the sixth aspect thereof, and provides a composite device wherein the end of the common operation shaft is connected to the push switch.

An eighth aspect of this invention is based on the sixth aspect thereof, and provides a composite device wherein the common operation shaft is rotatable about the end thereof, and the lever switch has a drive member connected to the common operation shaft, the drive member rotating about the end of the common operation shaft as the common operation shaft rotates about the end thereof.

A ninth aspect of this invention is based on the eighth aspect thereof, and provides a composite device wherein the drive member has a surface with a shape corresponding to a part of a sphere, and the casing has an inner surface with a shape corresponding to the shape of the surface of the drive member, and the surface of the drive member slidably contacts the inner surface of the casing.

A tenth aspect of this invention is based on the fourth aspect thereof, and provides a composite device further comprising means for providing a clicking resistance to the common operation shaft when the rotary encoder is operated through the common operation shaft.

DESCRIPTION OF THE PREFERRED EMBODIMENT

Figure 1:
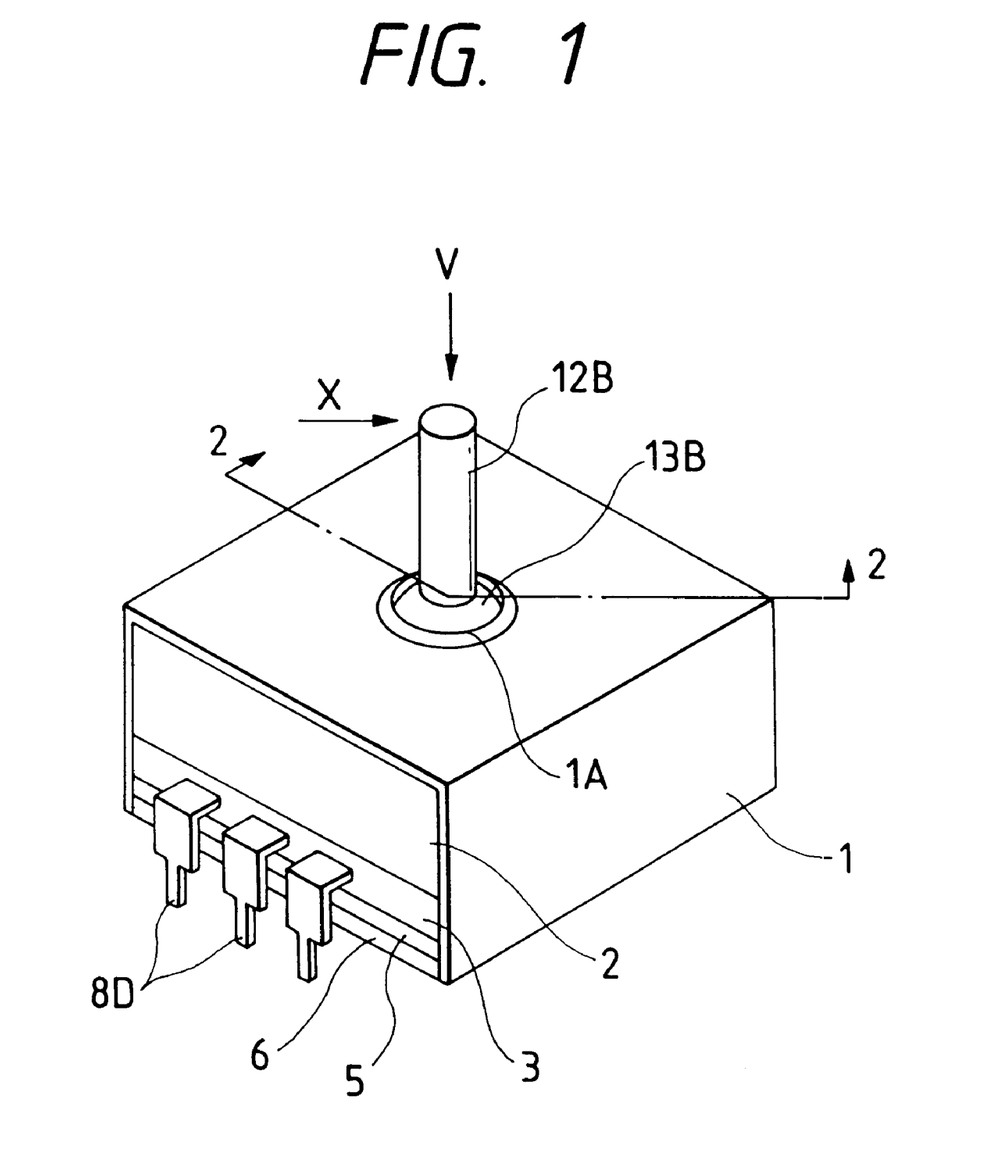
FIG. 1 is a perspective view of a multiple-way electronic component with a push switch according to an embodiment of this invention.
Figure 2:
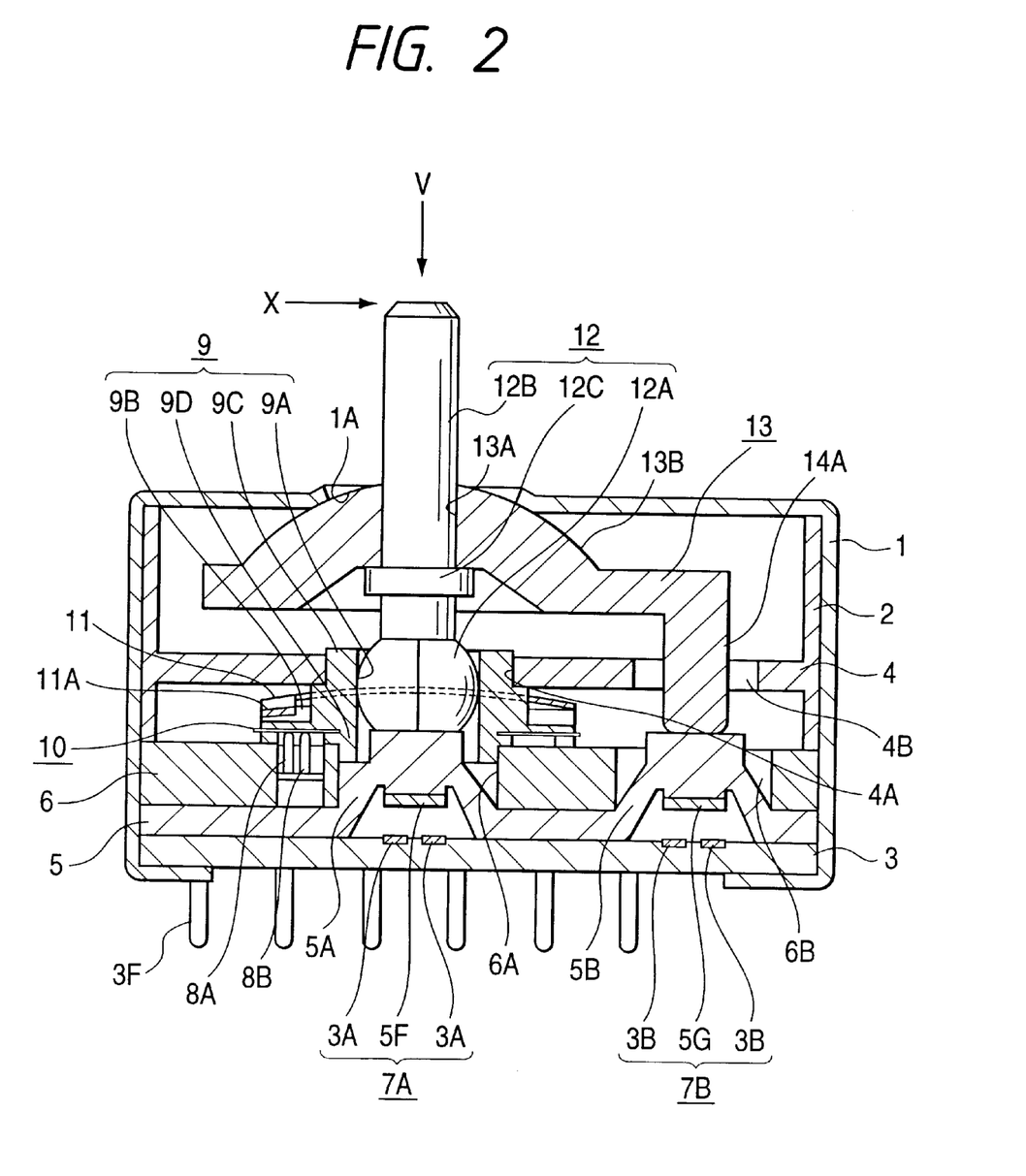
FIG. 2 is a sectional view taken along the line 2—2 in FIG. 1.
Figure 3:
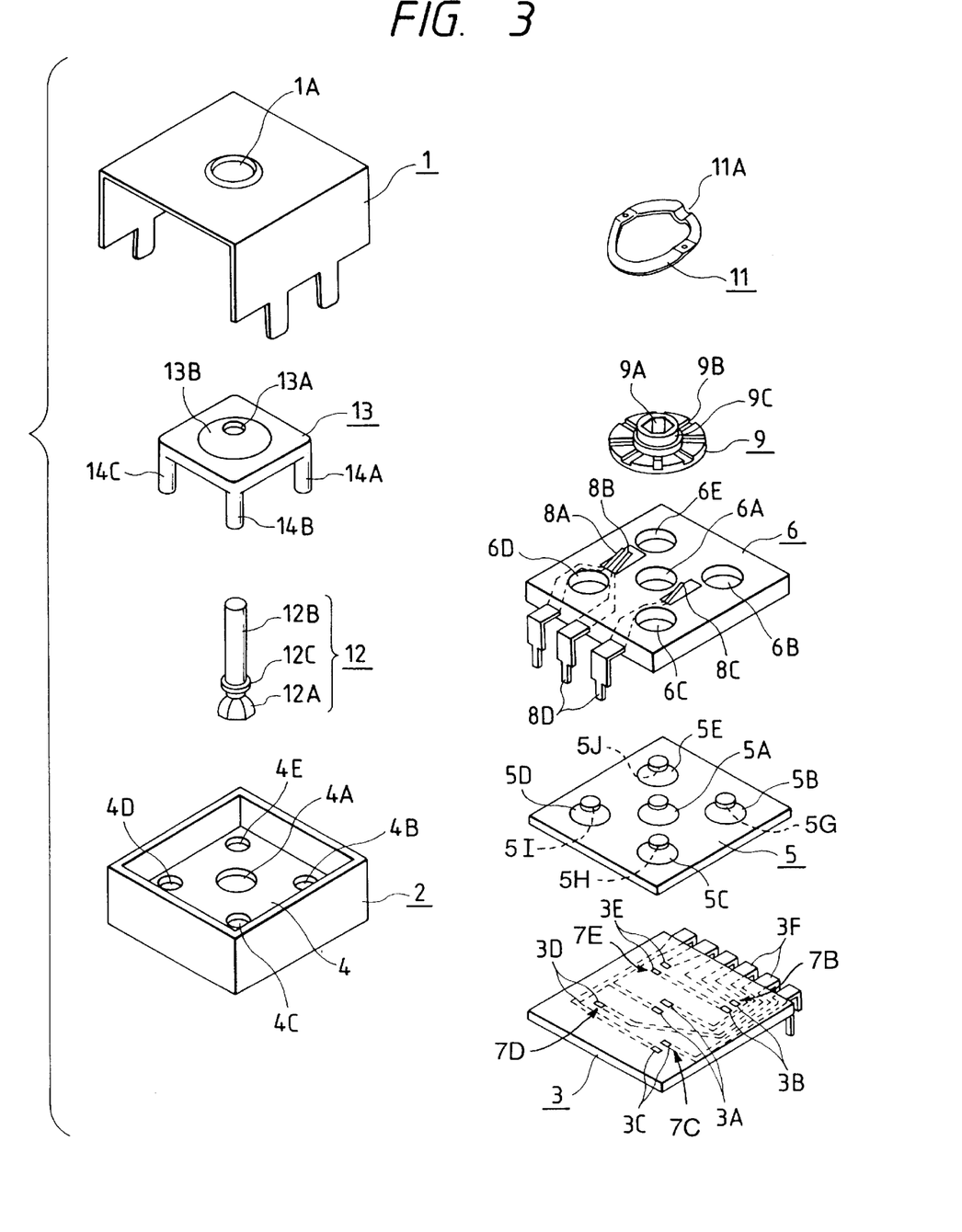
FIG. 3 is a perspective exploded view of the multiple-way electronic component in FIGS. 1 and 2.

With reference to FIGS. 1, 2, and 3, a multiple-way electronic component with a push switch includes an inverted-U-shaped cover or frame 1 which has a square or rectangular top portion (top wall), and two opposing rectangular side portions (side walls) extending downward from edges of the top portion. The top portion and the side portions of the cover 1 are integral with each other. The cover 1 is made of a metal plate. A center of the top portion of the cover 1 has a circular opening 1A.

The multiple-way electronic component of FIGS. 1, 2, and 3 also includes a frame 2 made of resin. The frame 2 is fixedly held between the side portions of the cover 1. The frame 2 has four side walls connected into a square or rectangular configuration having upper and lower open ends. The frame 2 also has a horizontally-extending square or rectangular intermediate wall 4. The edges of the intermediate wall 4 of the frame 2 are connected to the side walls thereof. The space extending inward of the four side walls of the frame 2 is divided into two regions by the intermediate wall 4 of the frame 2. The side walls and the intermediate wall 4 of the frame 2 are integral with each other.

The multiple-way electronic component of FIGS. 1, 2, and 3 further includes a square or rectangular base board (a square or rectangular base plate) 3 connected to and fitting in the lower end of the frame 2. The base board 3 closes the opening in the lower end of the frame 2.

The cover 1, the frame 2, and the base board 3 compose a box-shaped casing which accommodates various parts as will be explained later.

A center of the intermediate wall 4 of the frame 2 has a circular hole 4A also referred to as a central hole 4A. The intermediate wall 4 has four circular holes 4B, 4C, 4D, and 4E extending near the four corners thereof, respectively. The holes 4B, 4C, 4D, and 4E are also referred to as the corner holes or the peripheral holes 4B, 4C, 4D, and 4E. The corner holes 4B, 4C, 4D, and 4E extend outward of the central hole 4A.

A pair of fixed contacts 3A is provided on the upper surface of the base board 3 in a place corresponding to the position of the central hole 4A through the intermediate wall 4 of the frame 2. Four pairs of fixed contacts 3B, 3C, 3D, and 3E are provided on the upper surface of the base board 3 in places corresponding to the positions of the corner holes 4B, 4C, 4D, and 4E through the intermediate wall 4 of the frame 2, respectively. One side edge of the base board 3 are provided with terminals 3F electrically connected to the fixed contacts 3A, 3B, 3C, 3D, and 3E. Portions of the terminals 3F project outward from the box-shaped casing.

A square or rectangular rubber sheet 5 and a square or rectangular base board (a square or rectangular base plate) 6 are held between the frame 2 and the base board 3. Specifically, the rubber sheet 5 extends on the base board 3. The base board 6 extends between the rubber sheet 5 and the frame 2.

The rubber sheet 5 has an upwardly-projecting dome-shaped portion 5A in a place corresponding to the position of the central hole 4A through the intermediate wall 4 of the frame 2, that is, corresponding to the position of the pair of the fixed contacts 3A on the base board 3. An electrical conductor forming a movable contact 5F is provided on the lower surface of a top wall of the dome-shaped portion 5A of the rubber sheet 5. The movable contact 5F can be connected to and separated from the fixed contacts 3A. Thus, the fixed contacts 3A are electrically connected to or disconnected from each other by the movable contact 5F. The movable contact 5F and the fixed contacts 3A form parts of a central push switch 7A.

In addition, the rubber sheet 5 has upwardly-projecting dome-shaped portions 5B, 5C, 5D, and 5E in places corresponding to the positions of the corner holes 4B, 4C, 4D, and 4E through the intermediate wall 4 of the frame 2, that is, corresponding to the positions of the pairs of the fixed contacts 3B, 3C, 3D, and 3E on the base board 3, respectively. Electrical conductors forming movable contacts 5G, 5H, 5I, and 5J are provided on the lower surfaces of top walls of the dome-shaped portions 5B, 5C, 5D, and 5E of the rubber sheet 5, respectively. The movable contact 5G can be connected to and separated from the fixed contacts 3B. Thus, the fixed contacts 3B are electrically connected to or disconnected from each other by the movable contact 5G. The movable contact 5G and the fixed contacts 3B form parts of a peripheral push switch 7B. The movable contact 5H can be connected to and separated from the fixed contacts 3C. Thus, the fixed contacts 3C are electrically connected to or disconnected from each other by the movable contact 5H. The movable contact 5H and the fixed contacts 3C form parts of a peripheral push switch 7C. The movable contact 5I can be connected to and separated from the fixed contacts 3D. Thus, the fixed contacts 3D are electrically connected to or disconnected from each other by the movable contact 5I. The movable contact 5I and the fixed contacts 3D form parts of a peripheral push switch 7D. The movable contact 5J can be connected to and separated from the fixed contacts 3E. Thus, the fixed contacts 3E are electrically connected to or disconnected from each other by the movable contact 5J. The movable contact 5J and the fixed contacts 3E form parts of a peripheral push switch 7E.

The base board 6 has circular holes 6A, 6B, 6C, 6D, and 6E in places corresponding to the positions of the dome-shaped portions 5A, 5B, 5C, 5D, and 5E of the rubber sheet 5, respectively. The dome-shaped portions 5A, 5B, 5C, 5D, and 5E of the rubber sheet 5 fit into the holes 6A, 6B, 6C, 6D, and 6E of the base board 6, respectively. A flat portion of the rubber sheet 5 is held between the base board 3 and the base board 6.

The base board 6 has first and second rectangular holes. Major portions of resilient contact arms 8A and 8B are located in the first rectangular hole of the base board 6. Each of the resilient contact arms 8A and 8B is made of a resilient thin metal plate. Base ends of the resilient contact arms 8A and 8B are supported by the base board 6. The resilient contact arms 8A and 8B project upward from the first rectangular hole of the base board 6. A major portion of a resilient contact arm 8C is located in the second rectangular hole of the base board 6. The resilient contact arm 8C is made of a resilient thin metal plate. A base end of the resilient contact arm 8C is supported by the base board 6. The resilient contact arm 8C projects upward from the second rectangular hole of the base board 6. One side edge of the base board 6 is provided with terminals 8D electrically connected to the resilient contact arms 8A, 8B, and 8C, respectively. Portions of the terminals 8D project outward from the box-shaped casing.

A cylindrical rotary member 9 made of resin has an axially-extending central hole 9A with a shape of a regular hexagon. The hexagonal shape may be replaced by another polygonal shape. The rotary member 9 has a large-diameter portion or a flange portion which extends in a space between the base board 6 and the intermediate wall 4 of the frame 2. As will be explained later, the rotary member 9 fits into both the central hole 4A of the intermediate wall 4 of the frame 2 and the central hole 6A of the base board 6. The rotary member 9 is rotatably supported by the base board 6 and the intermediate wall 4 of the frame 2. The rotary member 9 can rotate in a circumferential direction relative to the frame 2 and the base board 6. The flange portion of the rotary member 9 has a rugged upper surface 9B formed by radially-extending grooves and heights between the grooves. A contact plate 10 is fixed to a lower surface of the flange portion of the rotary member 9. The combination of the contact plate 10 and the rotary member 9 is formed by a suitable process such as a molding process using an insert. The contact plate 10 can rotate together with the rotary member 9.

The rotary member 9 has a small-diameter ring portion 9C projecting axially upward from the flange portion thereof. The ring portion 9C of the rotary member 9 extends and fits into the central hole 4A through the intermediate wall 4 of the frame 2. The ring portion 9C of the rotary member 9 has an annular shoulder on which the edges of the intermediate wall 4 of the frame 2 around the central hole 4A are seated.

The rotary member 9 has a small-diameter ring portion 9D projecting axially downward from the flange portion thereof. The ring portion 9D of the rotary member 9 extends and fits into the central hole 6A through the base board 6. The ring portion 9D of the rotary member 9 has a downwardly-facing annular shoulder on which the edges of the walls of the base board 6 around the central hole 6A are seated.

Figure 4:
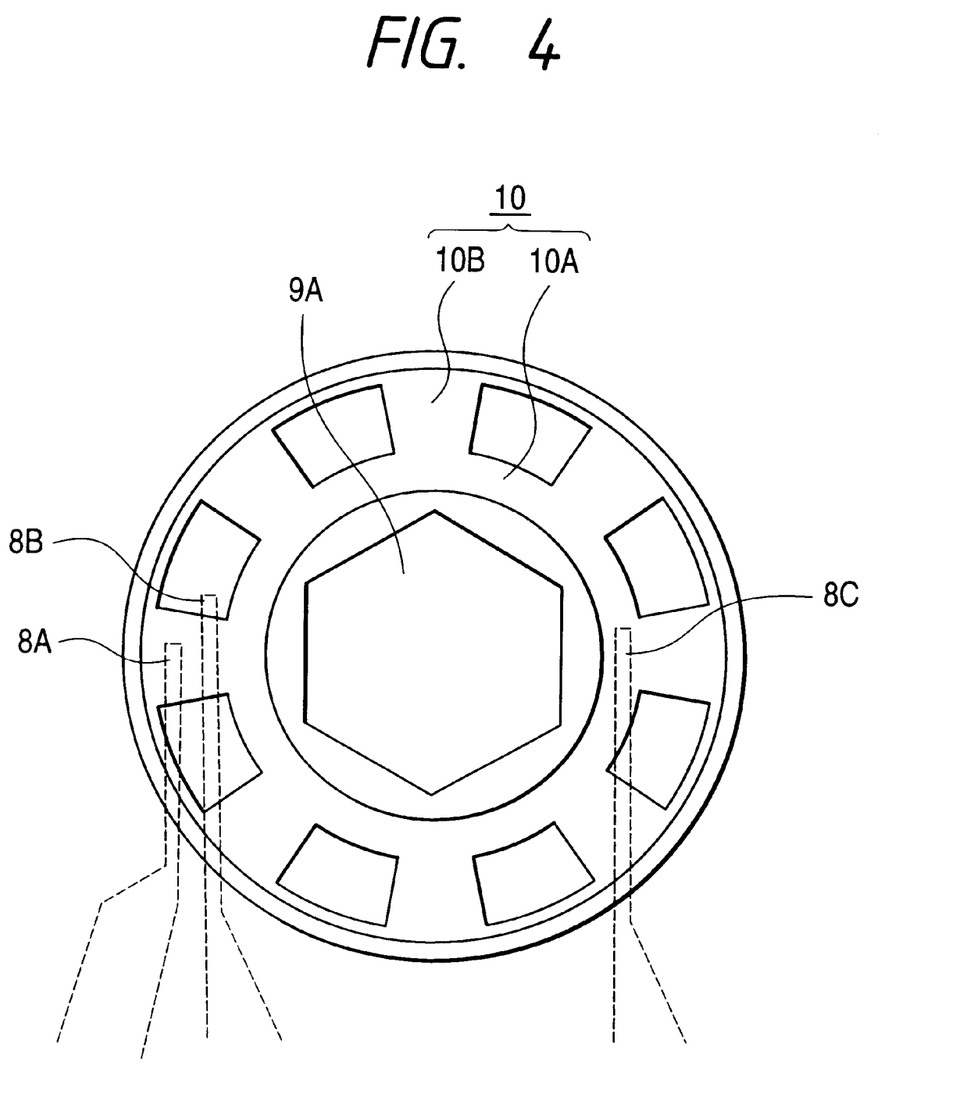
FIG. 4 is a bottom view of a rotary member in the multiple-way electronic component in FIGS. 1 and 2.

As shown in FIG. 4, the contact plate 10 has an inner ring contact 10A and radial contacts 10B. The radial contacts 10B extend radially outward from the inner ring contact 10A. Accordingly, the inner ring contact 10A and the radial contacts 10B are electrically connected to each other. The radial contacts 10B are spaced along a circumferential direction at equal angular intervals. The walls of the flange portion of the rotary member 9 are exposed at the spaces between the radial contacts 10B. As previously explained, the rotary member 9 is made of resin. Accordingly, the radial contacts 10B are separated from each other by insulating zones in the circumferential direction.

The tip of the resilient contact arm 8C is pressed against the inner ring contact 10A of the contact plate 10 by the elasticity of the resilient contact arm 8C. During circumferential rotation of the contact plate 10, that is, during circumferential rotation of the rotary member 9, the tip of the resilient contact arm 8C remains in touch with the inner ring contact 10A of the contact plate 10. The tip of the resilient contact arm 8A is pressed against one of the radial contacts 10B of the contact plate 10 or the walls of the flange portion of the rotary member 9 by the elasticity of the resilient contact arm 8A. During circumferential rotation of the contact plate 10, that is, during circumferential rotation of the rotary member 9, the tip of the resilient contact arm 8A sequentially and alternately meets the radial contacts 10B of the contact plate 10 and the walls of the flange portion of the rotary member 9 so that a first electric pulse signal can be generated between the resilient contact arms 8A and 8C. The tip of the resilient contact arm 8B is pressed against one of the radial contacts 10B of the contact plate 10 or the walls of the flange portion of the rotary member 9 by the elasticity of the resilient contact arm 8B. During circumferential rotation of the contact plate 10, that is, during circumferential rotation of the rotary member 9, the tip of the resilient contact arm 8B sequentially and alternately meets the radial contacts 10B of the contact plate 10 and the walls of the flange portion of the rotary member 9 so that a second electric pulse signal can be generated between the resilient contact arms 8B and 8C. The position of the tip of the resilient contact arm 8A is offset from the position of the tip of the resilient contact arm 8B in the circumferential direction with respect to the contact plate 10. Accordingly, the phase of the first electric pulse signal differs from the phase of the second electric pulse signal.

For example, the rotary member 9, the contact plate 10, and the resilient contact arms 8A, 8B, and 8C constitute parts of a rotary encoder.

It is preferable that the grooves in the upper surface 9B of the flange portion of the rotary member 9 correspond to the radial contacts 10B of the contact plate 10 or the insulating zones between the radial contacts 10B, respectively.

A ring-shaped spring 11 attached to the intermediate wall 4 of the frame 2 provides a clicking process or a tactile feeling. The click spring 11 has a downward projection 11A engaging the rugged upper surface 9B of the flange portion of the rotary member 9. Normally, the downward projection 11A of the click spring 11 is placed in one of the grooves in the upper surface 9B of the flange portion of the rotary member 9.

An operation member or an operation lever 12 has a ball-like lower end 12A. The horizontal cross-section of the central part of the ball-like end 12A of the operation member 12 has a shape of a regular hexagon. Accordingly, the end 12A of the operation member 12 will be referred to as the hexagonal ball-like end 12A. The hexagonal shape related to the ball-like end 12A of the operation member 12 may be replaced by another polygonal shape. The hexagonal ball-like end 12A of the operation member 12 fits in the central hole 9A of the rotary member 9. The lower end surface of the hexagonal ball-like end 12A of the operation member 12 contacts or engages the upper surface of the top of the dome-shaped portion 5A of the rubber sheet 5. The operation member 12 has a cylindrical operation shaft 12B extending upward from the hexagonal ball-like end 12A thereof. The hexagonal ball-like end 12A moves together with the operation shaft 12B. The operation shaft 12B extends through the central opening 1A in the top portion of the cover 1. Thus, an upper portion of the operation shaft 12B projects upward from the central opening 1A in the top portion of the cover 1. A portion of the operation shaft 12B which extends outward of the box-shaped casing can be accessed. The operation shaft 12B also extends through a central circular hole 13A in a drive member 13 disposed in the box-shaped casing. The hexagonal ball-like end 12A of the operation member 12 engages the inner surfaces of the rotary member 9 which define the central hole 9A. The engagement between the hexagonal ball-like end 12A of the operation member 12 and the rotary member 9 is designed to allow the following movements. The operation member 12 can be moved upward and downward relative to the rotary member 9. In other words, the operation member 12 can be moved axially relative to the rotary member 9. The operation member 12 can be swung about the hexagonal ball-like end 12A, and thus can be tilted from the vertically-erected position (the neutral position). The rotary member 9 rotates circumferentially in accordance with circumferential rotation of the operation member 12.

The drive member 13 has a square or rectangular plate, a central part of which is formed with a dome-shaped or hemispherical upward projection 13B. The center with respect to the hemispherical surface of the upward projection 13B of the drive member 13 is coincident with the center of the hexagonal ball-like end 12A of the operation member 12. As previously mentioned, the operation shaft 12B extends through the central hole 13A in the drive member 13. An intermediate portion of the operation shaft 12B has an annular flange 12C which supports the lower surface (the ceiling) of the dome-shaped projection 13B of the drive member 13. Thus, the drive member 13 is connected to the operation shaft 12B. As the operation shaft 12B rotates about the hexagonal ball-like end 13A, the drive member 13 rotates together with the operation shaft 12B. The outer surface of the dome-shaped projection 13B of the drive member 13 agrees with a surface of a part of a sphere. Also, the inner surface of the top portion of the cover 1 around the central opening 1A corresponds to a surface of a part of a same-size sphere. Thus, the outer surface of the dome-shaped projection 13B of the drive member 13 conforms to the inner surface of the top portion of the cover 1 around the central opening 1A. The outer surface of the dome-shaped projection 13B of the drive member 13 slidably contacts the inner surface of the top portion of the cover 1 around the central opening 1A. The dome-shaped projection 13B of the drive member 13 is held between the flange 12C of the operation shaft 12B and the top portion of the cover 1. The dome-shaped projection 13B of the drive member 13 can be rotated and tilted relative to the top portion of the cover 1 while sliding on the inner surface of the top portion of the cover 1 around the central opening 1A.

Projections 14A, 14B, 14C, and 14D extend downward from portions of the square or rectangular plate of the drive member 13 near four corners thereof, respectively. It should be noted that the projection 14D is not shown. The lower ends of the projections 14A, 14B, 14C, and 14D contact or engage the upper surfaces of the top walls of the dome-shaped portions 5B, 5C, 5D, and 5E of the rubber sheet 5, respectively. Normally, the drive member 13 and the operation member 12 are held in their central positions (their neutral positions) by the contact between the projections 14A, 14B, 14C, and 14D of the drive member 13 and the dome-shaped portions 5B, 5C, 5D, and 5E of the rubber sheet 5.

The multiple-way electronic component of FIGS. 1–4 operates as follows. When the operation shaft 12B which extends outward of the box-shaped casing is circumferentially rotated by the user while being held in its neutral position, the hexagonal ball-like end 12A of the operation member 12 is also rotated. The rotary member 9 circumferentially rotates in accordance with the rotation of the hexagonal ball-like end 12A of the operation member 12 since the rotary member 9 and the hexagonal ball-like end 12A of the operation member 12 are in engagement with each other. The contact plate 10 rotates together with the rotary member 9.

During the circumferential rotation of the contact plate 10, the tip of the resilient contact arm 8C remains in touch with the inner ring contact 10A of the contact plate 10. During the circumferential rotation of the contact plate 10, the tip of the resilient contact arm 8A sequentially and alternately meets the radial contacts 10B of the contact plate 10 and the walls of the flange portion of the rotary member 9 so that a first electric pulse signal can be generated between the resilient contact arms 8A and 8C. During the circumferential rotation of the contact plate 10, the tip of the resilient contact arm 8B sequentially and alternately meets the radial contacts 10B of the contact plate 10 and the walls of the flange portion of the rotary member 9 so that a second electric pulse signal can be generated between the resilient contact arms 8B and 8C. The first and second electric pulse signals can be transmitted from the resilient contact arms 8A, 8B, and 8C to an external device (not shown) via the terminals 8D.

As previously mentioned, under normal conditions, the downward projection 11A of the click spring 11 is placed in one of the grooves in the upper surface 9B of the flange portion of the rotary member 9. When the rotary member 9 starts to circumferentially rotate, the downward projection 11A of the click spring 11 moves out of the groove in the upper surface 9B of the flange portion of the rotary member 9. During the circumferential rotation of the rotary member 9, the downward projection 11A of the click spring 11 slides on the upper surface 9B of the flange portion of the rotary member 9 while following the ruggedness therein. Thus, the click spring 11 provides a tactile feeling or a resistance feeling to the user who rotates the operation shaft 12B. The provided tactile feeling corresponds to the generation of the first and second electric signals. At an end of the circumferential rotation of the rotary member 9, the downward projection 11A of the click spring 11 falls into one of the grooves in the upper surface 9B of the flange portion of the rotary member 9.

Figure 5:
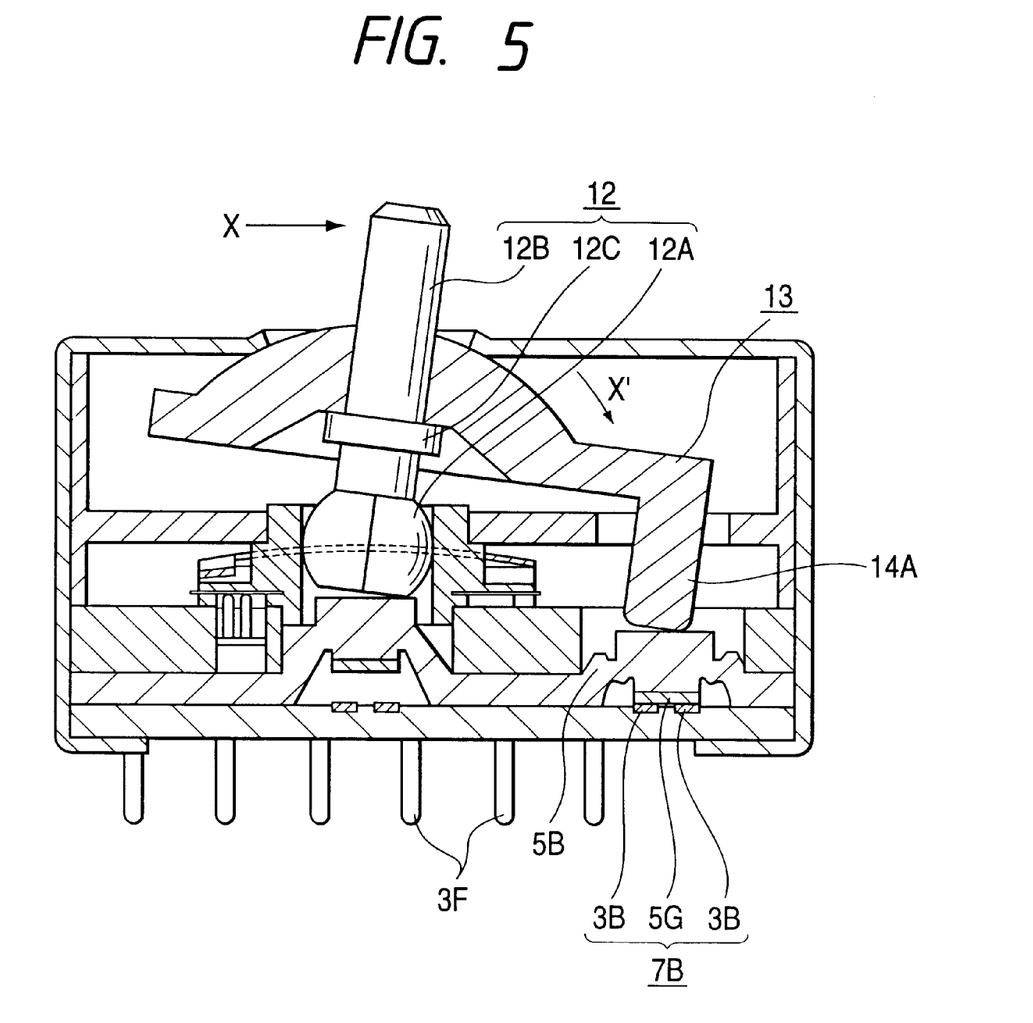
FIG. 5 is a sectional view of the multiple-way electronic component of FIGS. 1 and 2 which is in a state where a lateral force is applied to an operation lever.

When the operation shaft 12B is tilted from its neutral position along the direction X in FIGS. 1 and 2 by a lateral force applied thereto, the operation member 12 rotates clockwise about the hexagonal ball-like end 12A thereof. As shown in FIG. 5, the drive member 13 rotates along the direction X' in accordance with the clockwise rotation of the operation member 12 since the drive member 13 is connected to the operation shaft 12B. As the drive member 13 rotates along the direction X', the projection 14A of the drive member 13 presses the dome-shaped portion 5B of the rubber sheet 5 downward and hence deforms the dome-shaped portion 5B accordingly. The movable contact 5G on the dome-shaped portion 5B moves downward and meets the fixed contacts 3B in accordance with the deformation of the dome-shaped portion 5B. Accordingly, the peripheral push switch 7B changes from an OFF state to an ON state. An electric signal representing the state of the peripheral push switch 7B is transmitted from the peripheral push switch 7B to an external device (not shown) via the terminals 3F.

When the operation shaft 12B is released from the lateral force, the dome-shaped portion 5B of the rubber sheet 5 returns to its original shape due to its elasticity. As the dome-shaped portion 5B of the rubber sheet 5 returns to its original shape, the movable contact 5G separates from the fixed contacts 3B so that the peripheral push switch 7B returns to its OFF state. As the dome-shaped portion 5B of the rubber sheet 5 returns to its original shape, the dome-shaped portion 5B forces the projection 14A of the drive member 13 and simultaneously rotates the drive member 13 counterclockwise. The operation member 12 rotates counterclockwise in accordance with the counterclockwise rotation of the drive member 13. Thus, the operation member 12 is returned to its neutral position (shown in FIG. 2).

Figure 6:
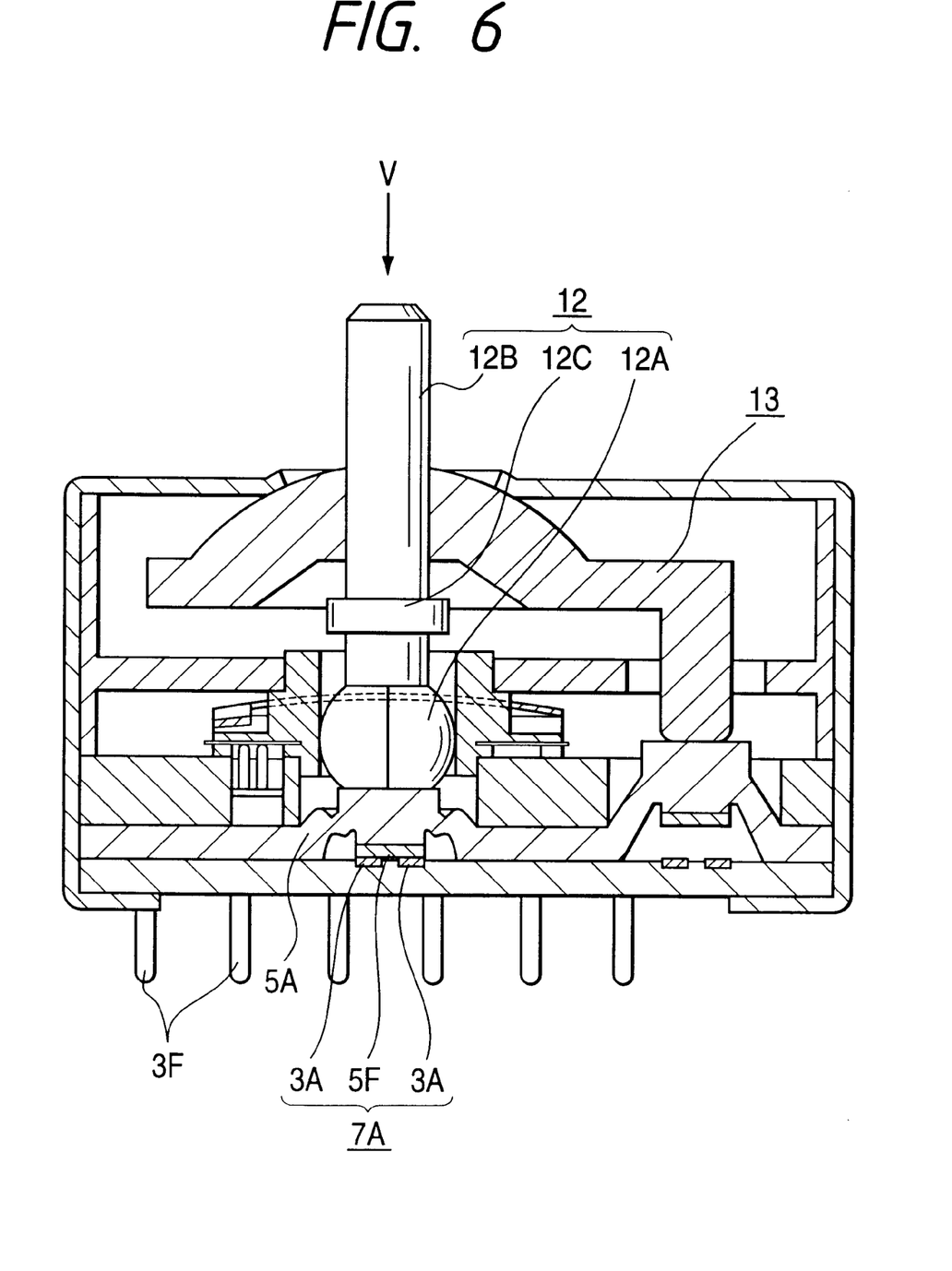
FIG. 6 is a sectional view of the multiple-way electronic component of FIGS. 1 and 2 which is in a state where a downward force is applied to the operation lever.

When the operation shaft 12B is pushed downward or axially from its neutral position along the direction V in FIGS. 1 and 2 by a vertical force applied thereto, the hexagonal ball-like end 12A of the operation member 12 is moved downward. As shown in FIG. 6, the hexagonal ball-like end 12A of the operation member 12 presses the dome-shaped portion 5A of the rubber sheet 5 downward and hence deforms the dome-shaped portion 5B accordingly while being moved downward. The movable contact 5F on the dome-shaped portion 5A moves downward and meets the fixed contacts 3A in accordance with the deformation of the dome-shaped portion 5A. Accordingly, the central push switch 7A changes from an OFF state to an ON state. An electric signal representing the state of the central push switch 7A is transmitted from the central push switch 7A to an external device (not shown) via the terminals 3F.

When the operation shaft 12B is released from the vertical force, the dome-shaped portion 5A of the rubber sheet 5 returns to its original shape due to its elasticity. As the dome-shaped portion 5A of the rubber sheet 5 returns to its original shape, the movable contact 5F separates from the fixed contacts 3A so that the central push switch 7A returns to its OFF state. As the dome-shaped portion 5A of the rubber sheet 5 returns to its original shape, the dome-shaped portion 5A moves upward the operation member 12 while forcing the hexagonal ball-like end 12A of the operation member 12. Thus, the operation member 12 is returned to its neutral position (shown in FIG. 2).

As understood from the above explanation, the electronic component of FIGS. 1–6 can be operated in three different ways corresponding to a rotary encoder, a toggle switch (a lever switch), and a push switch respectively. Here, the toggle switch (the lever switch) is formed by the drive member 13 and at least one of the peripheral push switches 7B, 7C, 7D, and 7E.

The electronic component of FIGS. 1–6 may be modified as follows. In a first modification, dome-shaped movable contacts made of resilient thin metal plates are used instead of the combinations of the movable contacts 5F, 5G, 5H, 5I, and 5J and the dome-shaped portions 5A, 5B, 5C, 5D, and 5E of the rubber sheet 5. A second modification includes a rotatively-operated variable resistor instead of the rotary encoder.

What is claimed is:

1. A multiple-way electronic component comprising:
   a box-shaped casing having an upper wall, a lower wall, and an intermediate wall, the upper wall having a circular opening at its central area, the intermediate wall being located between the upper wall and the lower wall;
   a first push switch disposed in the casing and located on a central area of the lower wall of the casing;
   second, third, fourth, and fifth push switches disposed in the casing and located on peripheral areas of the lower wall of the casing;
   a resilient contact arm disposed in the casing and supported on the lower wall of the casing;
   a rotary member disposed in the casing and rotatably supported by the intermediate wall of the casing, the rotary member having a polygonal hole at its central area;
   a movable contact retained by the rotary member, and being movable into and out of contact with the resilient contact arm in accordance with rotation of the rotary member;
   an operation member having a lower end which fits in the polygonal hole in the rotary member and which has a shape corresponding to a shape of the polygonal hole, the lower end engaging the first push switch, the operation member having a cylindrical shaft extending upward from the lower end thereof, the cylindrical shaft extending to an exterior of the casing through the circular opening in the upper wall of the casing, the operation member and the rotary member being rotatable together, the operation member being movable upward and downward relative to the rotary member, the operation member being tiltable relative to the rotary member; and
   a drive member having an upward projection which rotatably and tiltably contacts a lower surface of the upper wall of the casing around its circular opening, the upward projection having a central hole through which the cylindrical shaft extends, the cylindrical shaft being rotatable relative to the upward projection of the drive member, the cylindrical shaft being movable upward and downward relative to the upward projection of the drive member, the drive member having downward projections engaging the second, third, fourth, and fifth push switches respectively.

2. A multiple-way electronic component as recited in claim 1, wherein the resilient contact arm and the movable contact form a rotary encoder.

3. A multiple-way electronic component as recited in claim 1, further comprising a click spring provided between the rotary member and the intermediate wall of the casing, the click spring has a downward projection engaging a rugged surface of the rotary member for providing a tactile feeling during rotation of the rotary member.

* * * * *